US012715225B2

(12) United States Patent
Nakatsuji et al.

(10) Patent No.: US 12,715,225 B2
(45) Date of Patent: Aug. 25, 2026

(54) IMAGE FORMING APPARATUS

(71) Applicant: KYOCERA Document Solutions Inc., Osaka (JP)

(72) Inventors: Hiroomi Nakatsuji, Osaka (JP); Jun Nakano, Osaka (JP); Masato Usui, Osaka (JP); Naoko Kawashima, Osaka (JP)

(73) Assignee: Kyocera Document Solutions, Inc. (JP)

( * ) Notice: Subject to any disclaimer, the term of this patent is extended or adjusted under 35 U.S.C. 154(b) by 133 days.

(21) Appl. No.: 18/641,304

(22) Filed: Apr. 19, 2024

(65) Prior Publication Data

US 2024/0359483 A1 Oct. 31, 2024

(30) Foreign Application Priority Data

Apr. 27, 2023 (JP) ................................ 2023-072909

(51) Int. Cl.
*B41J 2/21* (2006.01)

(52) U.S. Cl.
CPC .................................. *B41J 2/2142* (2013.01)

(58) Field of Classification Search
CPC .... B41J 2/2142; B41J 2/16579; B41J 2/2139; B41J 2/0451; B41J 29/393; B41J 2029/3935; B41J 29/38
See application file for complete search history.

(56) References Cited

U.S. PATENT DOCUMENTS

2013/0215178 A1 8/2013 Ueshima
2021/0303950 A1 * 9/2021 Takesue ................ B41J 2/2139

FOREIGN PATENT DOCUMENTS

JP 2013-169760 9/2013

* cited by examiner

*Primary Examiner* — Jannelle M Lebron

(57) ABSTRACT

An image forming apparatus includes a recording head, a control unit, an ejection malfunction detecting unit, and an ejection malfunction nozzle determining unit. The recording head ejects ink corresponding to an image to be printed, using arranged nozzles. The control unit determines nozzles corresponding to the image and causes the recording head to eject ink from the nozzles. The ejection malfunction detecting unit causes the recording head to print a first test pattern on a print sheet, and detects a density defect due to ejection malfunction in a scanned image of the first test pattern. The ejection malfunction nozzle determining unit causes the recording head to print a second test pattern if the density defect is detected by the ejection malfunction detecting unit, and not perform printing of the second test pattern if no density defects are detected by the ejection malfunction detecting unit.

5 Claims, 9 Drawing Sheets

IMAGE FORMING APPARATUS

CROSS-REFERENCE TO RELATED APPLICATIONS

This application relates to and claims priority rights from Japanese Patent Application No. 2023-072909, filed on Apr. 27, 2023, the entire disclosures of which are hereby incorporated by reference herein.

BACKGROUND

1. Field of the Present Disclosure

The present disclosure relates to an image forming apparatus.

2. Description of the Related Art

An inkjet image forming apparatus prints a test pattern using a recording head; on the basis of an image of the printed test pattern, determines an ejection malfunction nozzle that can not properly eject ink among nozzles that eject ink in the recording head; and increases an ink amount of an adjacent dot.

When the test pattern is printed for determining an ejection malfunction nozzle in the middle of a print job of an image specified by a user, the print job is suspended. Further, in order to perform a correction process against the ejection malfunction nozzle, it is required to individually determine each ejection malfunction nozzle. It takes long time to individually determine each ejection malfunction nozzle due to an image process for a scanned image of the test pattern, and therefore it causes long suspending time of the print job.

SUMMARY

An image forming apparatus according to an aspect of the present disclosure includes a recording head, a control unit, an ejection malfunction detecting unit, and an ejection malfunction nozzle determining unit. The recording head is configured to eject ink corresponding to an image to be printed, using arranged nozzles. The control unit is configured to determine nozzles corresponding to the image and cause the recording head to eject ink from the nozzles. The ejection malfunction detecting unit is configured to cause the recording head (a) to print a first test pattern on a print sheet using the recording head, and (b) detect a density defect due to ejection malfunction in a scanned image of the first test pattern. The ejection malfunction nozzle determining unit is configured to cause the recording head to (a) print a second test pattern using the recording head if the density defect is detected by the ejection malfunction detecting unit, and (b) not to perform printing of the second test pattern if no density defects are detected by the ejection malfunction detecting unit.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
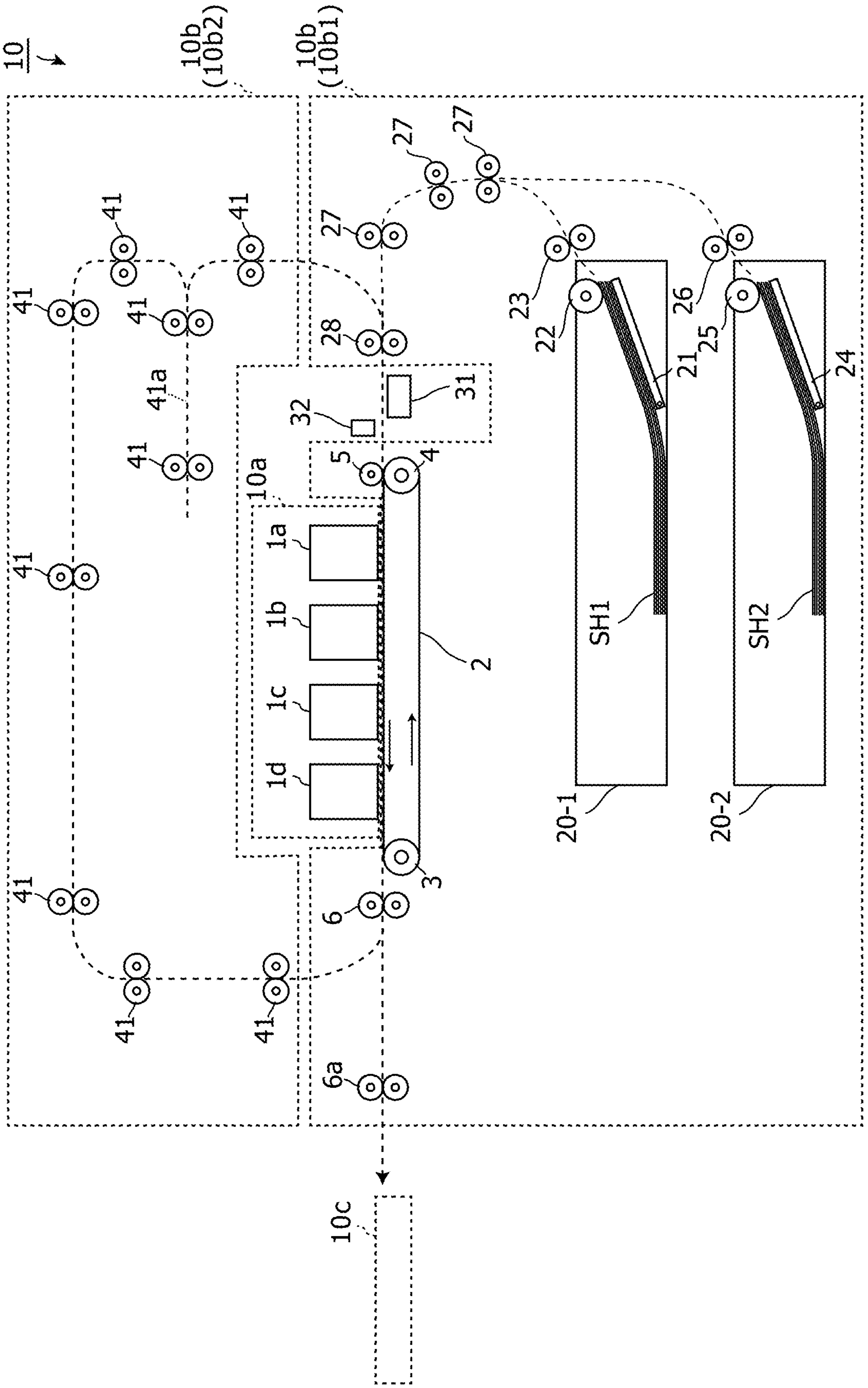
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral.

The image forming apparatus 10 shown in FIG. 1 includes a print engine 10*a* and a sheet transportation unit 10*b*. The print engine 10*a* physically forms an image to be printed on a print sheet (print paper sheet or the like). In this embodiment, the print engine 10*a* is a line-type inkjet print engine.

In this embodiment, the print engine 10*a* includes line-type head units 1*a* to 1*d* corresponding to four ink colors: Cyan, Magenta, Yellow, and Black.

Figure 2:
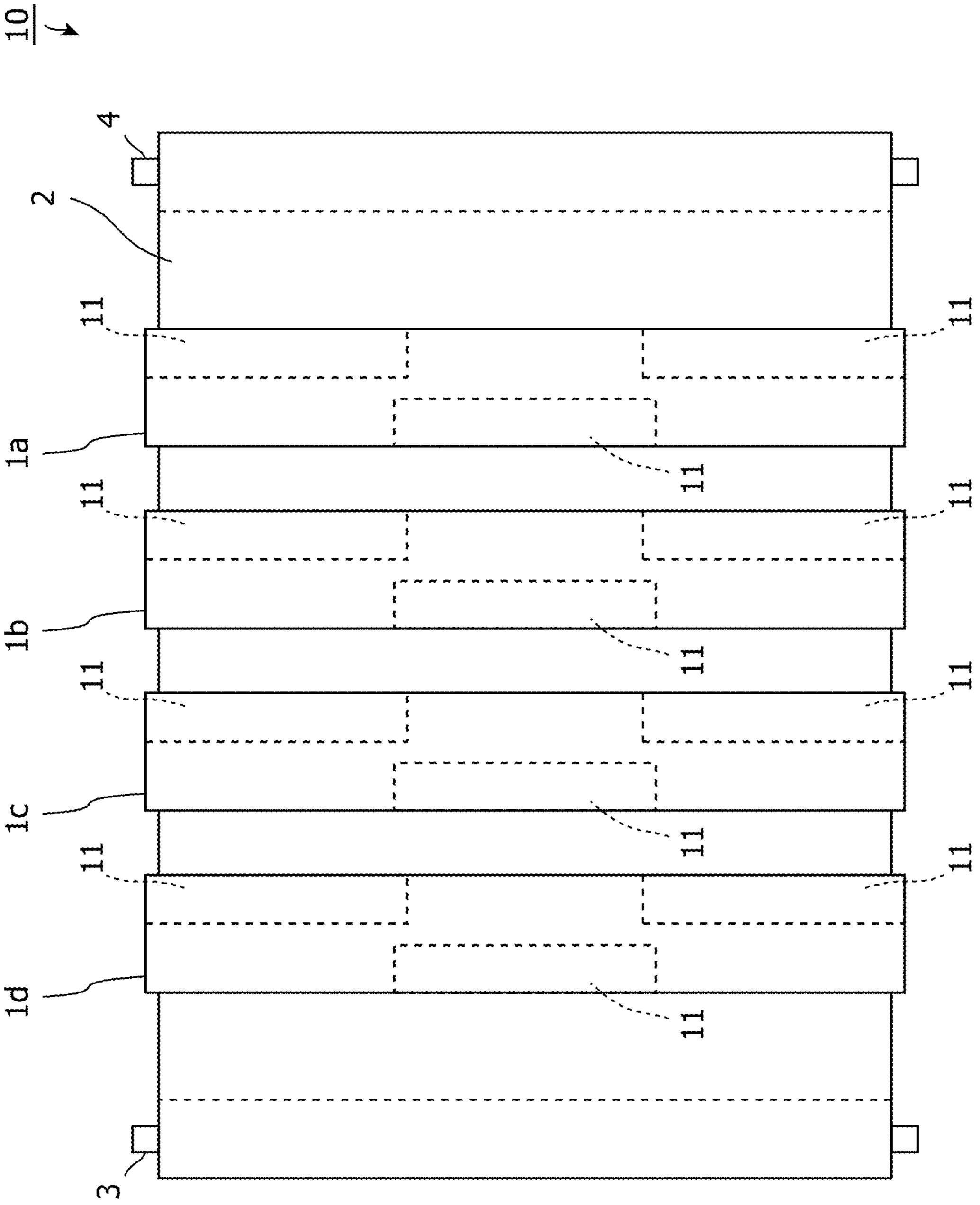
FIG. 2 shows a plane view of an example of recording heads 1*a* to 1*d* in the image forming apparatus 10 shown in FIG. 1.

FIG. 2 shows a plane view of an example of recording heads 1*a* to 1*d* in the image forming apparatus 10 shown in FIG. 1. As shown in FIG. 2, for example, in this embodiment, each of the inkjet recording units 1*a*, 1*b*, 1*c* and 1*d* includes plural (here, three) head units 11. The head units 11 are arranged along a primary scanning direction, and are capable of being mounted to and demounted from a main body of the image forming apparatus. Each of the recording heads 1*a*, 1*b*, 1*c* and 1*d* may include only one head unit 11. The head unit 11 of the inkjet recording unit 1*a*, 1*b*, 1*c* or 1*d* includes 2-dimensionally arranged nozzles, and ejects ink corresponding to the image specified by a user (i.e. corresponding to an image to be printed) using the nozzles.

The sheet transportation unit 10*b* transports the print sheet to the print engine 10*a* along a predetermined transportation path, and transports the print sheet after printing from the print engine 10*a* to a predetermined output destination (here, an output tray 10*c* or the like).

The sheet transportation unit 10*b* includes a main sheet transportation unit 10*b*1 a sheet and circulation transportation unit 10*b*2. In duplex printing, the main sheet transportation unit 10*b*1 transports to the print engine 10*a* a print sheet to be used for printing of a first-surface page image, and the circulation sheet transportation unit **10*b*2 transports the print sheet from a posterior stage of the print engine 10*a* to a prior stage of the print engine 10*a*** with detaining a predetermined number of print sheets.

In this embodiment, the main sheet transportation unit **10*b*1 includes (a) a circular-type transportation belt 2 that is arranged so as to be opposite to the print engine 10*a* and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6*a***.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units **1*a* to 1*d* in turn, and on the print sheet, images of respective colors are printed by the inkjet recording units 1*a* to 1*d*. Subsequently, after the color printing, the print sheet is outputted by the output roller pairs 6 and 6*a* to an output tray 10*c*** or the like.

Further, the main sheet transportation unit **10*b*1 includes plural sheet feeding cassettes 20-1 and 20-2. The sheet feeding cassettes 20-1 and 20-2 store print sheets SH1 and SH2, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2**.

When performing duplex printing, the circulation sheet transportation unit **10*b*2 returns the print sheet from a predetermined position in a downstream side of the print engine 10*a* to a predetermined position in an upstream side of the print engine 10*a* (here, to a predetermined position in an upstream side of a line sensor 31 mentioned below). The circulation sheet transportation unit 10*b*2 includes a transportation roller 41, and a switch back transportation path 41*a* that reverses a movement direction of the print sheet in order to change a surface that should face the print engine 10*a*** among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges (both side edges) of the print sheet. For example, the line sensor 31 is a CIS (Contact Image Sensor). In this embodiment, the line sensor 31 is arranged at a position between the registration roller 28 and the print engine **10*a***.

The sheet detecting sensor 32 is an optical sensor that detects a front end of the print sheet SH1 or SH2 passes through a predetermined position on the transportation path. The line sensor 31 detects the positions of the both side end edges at a time point that the front end of the print sheet SH1 or SH2 is detected by the sheet detecting sensor 32.

For example, as shown in FIG. 1, the print engine **10*a* is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10*b*2 transports the print sheet from the downstream side of the print engine 10*a* to the upstream side of the line sensor 31** with changing an orientation of the print sheet in a switch back manner.

Figure 3:
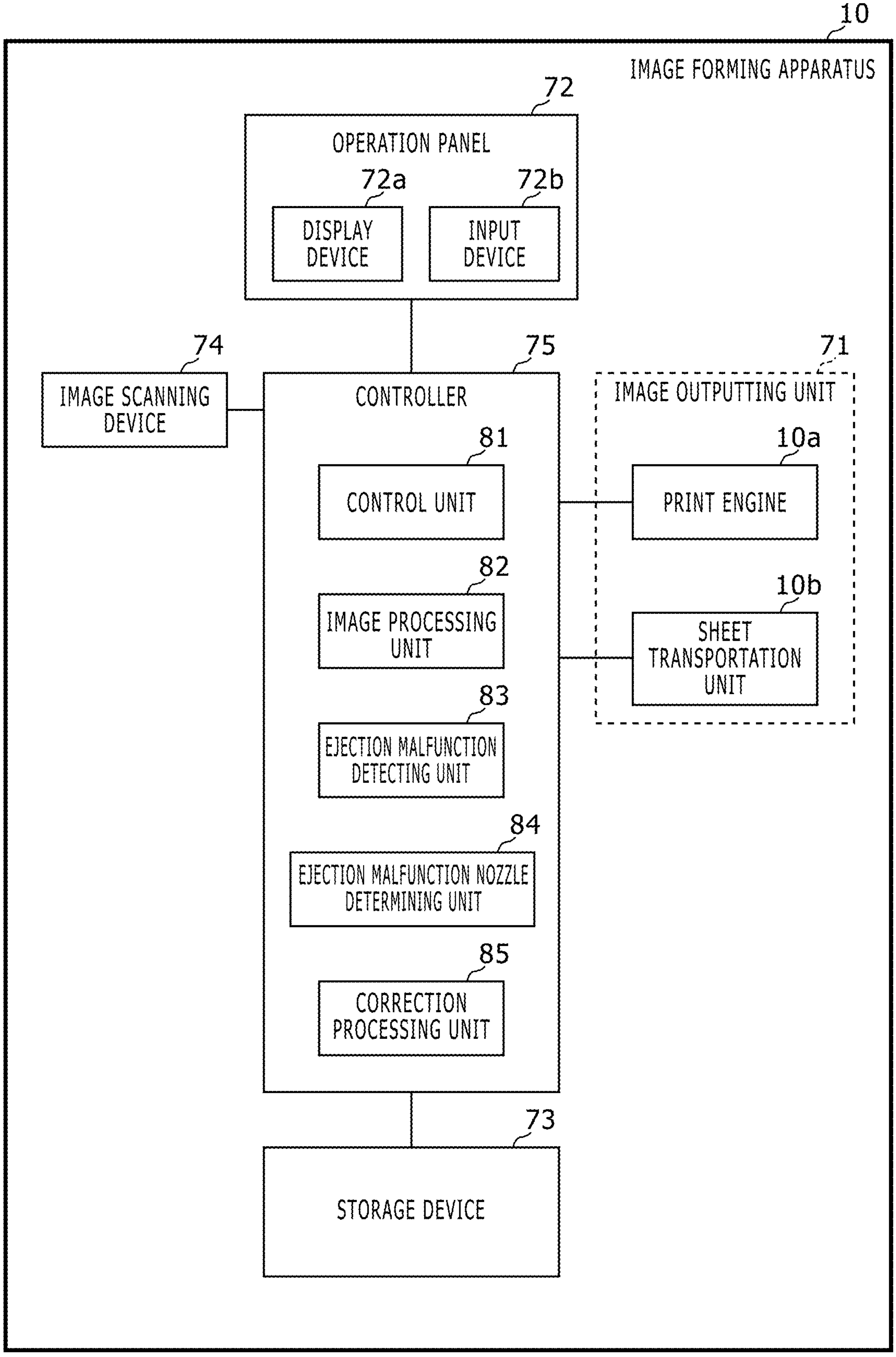
FIG. 3 shows a block diagram that indicates an electronic configuration of the image forming apparatus 10 in the embodiment according to the present disclosure.

FIG. 3 shows a block diagram that indicates an electronic configuration of the image forming apparatus 10 in the embodiment according to the present disclosure. As shown in FIG. 3, the image forming apparatus 10 includes not only an image outputting unit 71 that includes the mechanical configuration shown in FIGS. 1 and 2 but an operation panel 72, a storage device 73, an image scanning device 74, and a controller 75.

The operation panel 72 is arranged on a housing surface of the image forming apparatus 10, and includes a display device **72*a* such as a liquid crystal display and an input device 72*b* such as a hard key and/or a touch panel, and displays sorts of messages for a user using the display device 72*a* and receives a user operation using the input device 72*b***.

The storage device 73 is a non-volatile storage device (flash memory, hard disk drive or the like) in which data, a program and the like have been stored that are required for control of the image forming apparatus 10.

The image scanning device 74 includes a platen glass and an auto document feeder, and optically scans a document image from a document put on the platen glass or a document fed by the auto document feeder, and generates image data of the document image.

The controller 75 includes a computer that performs a software process in accordance with a program, an ASIC (Application Specific Integrated Circuit) that performs a predetermined hardware process, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required). Here, the controller 75 acts as a control unit 81, an image processing unit 82, an ejection malfunction detecting unit 83, an ejection malfunction nozzle determining unit 84, and a correction processing unit 85.

The control unit 81 controls the image outputting unit 71 (the print engine **10*a*, the sheet transportation unit 10*b* and the like), and thereby performs a print job requested by a user. In this embodiment, the control unit 81 causes the image processing unit 82 to perform a predetermined image process, and controls the print engine 10*a* (the head units 11) and causes the head units 11 to eject ink and thereby forms a print image on a print sheet. The image processing unit 82** performs a predetermined image process such as RIP (Raster Image Processing), color conversion, halftoning and/or the like for image data of a printing image.

Specifically, the control unit 81 causes the print engine **10*a*** to print a user document image based on printing image data specified by a user or a test patter mentioned below.

Further, in this embodiment, the control unit 81 has an automatic centering function that (a) determines as an actual sheet center position a center position of a print sheet on the basis of the positions of both side end edges of the print sheet detected by the line sensor 31, and (b) adjusts a center position of an image to be printed, on the basis of a difference from the actual sheet center position, and performs the automatic centering function as a hardware process.

Specifically, in the automatic centering function, the control unit 81 changes a depicting position of the image to be printed, in a primary scanning direction by a difference between a reference center position of the print engine 10*a* and the actual sheet center position. In this embodiment, because the nozzles of the recording heads 1*a* to 1*d* do not move, a nozzle corresponding to each pixel in the image to be printed is changed correspondingly to the depicting position of the image to be printed.

As mentioned, the control unit 81 determines nozzles corresponding to the image to be printed (a nozzle corresponding to each pixel), correspondingly to a position of a print sheet, and causes the recording heads 1*a* to 1*d* to eject ink from the determined nozzles.

The ejection malfunction detecting unit 83 causes the recording head to (a) print a first test pattern on a print sheet using the recording head 1*a*, 1*b*, 1*c* or 1*d*, and (b) detects a density defect due to ejection malfunction in a scanned image of the first test pattern. The first test patterns are individually printed for each of the ink colors. The density defect is detected on the basis of a primary-scanning-directional density distribution of the scanned image. Such ejection malfunction of a nozzle includes non ejection, ejection deviation or the like. "Ejection deviation" means a state that deviation of a hitting position of an ink droplet ejected from a nozzle occurs in the primary scanning direction.

In this embodiment, the line sensor 31 is installed to detect a position of a print sheet, and therefore, for example, after the test pattern is printed on a print sheet, the circulation transportation unit 10*b*2 transports the print sheet and the line sensor 31 scans an image of the printed test pattern.

If the line sensor 31 is used to acquire the scanned image of the test pattern, the scanned image of the test pattern is automatically acquired. Instead of the line sensor 31, the print sheet on which the test pattern has been printed may be immediately outputted and set on the image scanning device 74 by a user, and the image on the print sheet may be scanned by the image scanning device 74.

Figure 4:
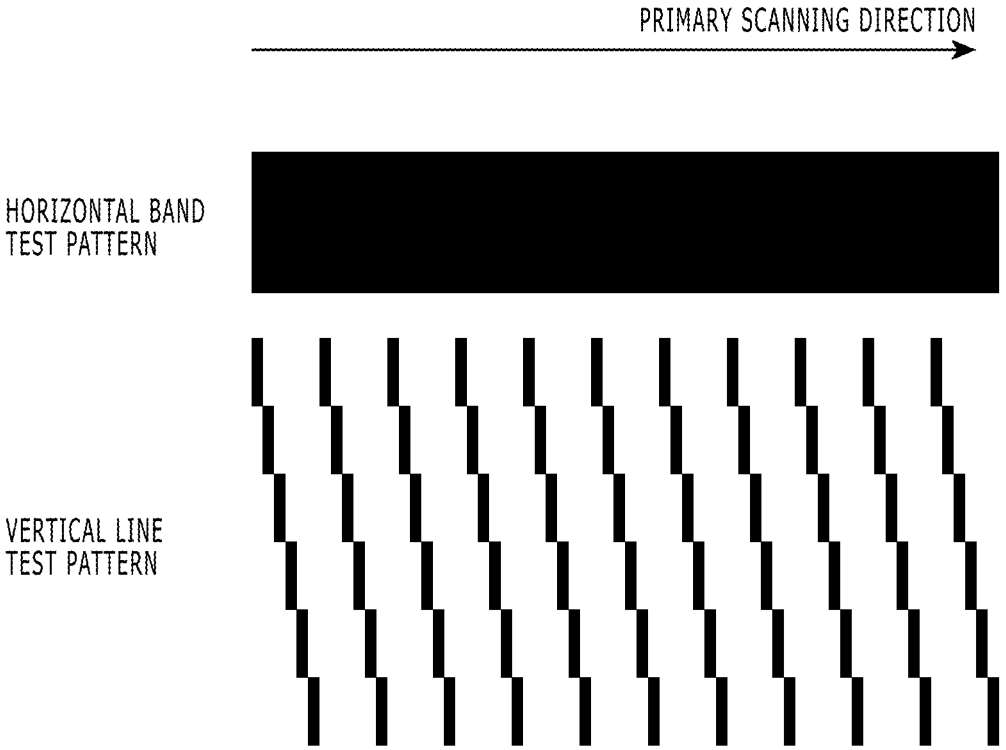
FIG. 4 shows a diagram that indicates an example of a first test pattern.
Figure 5:
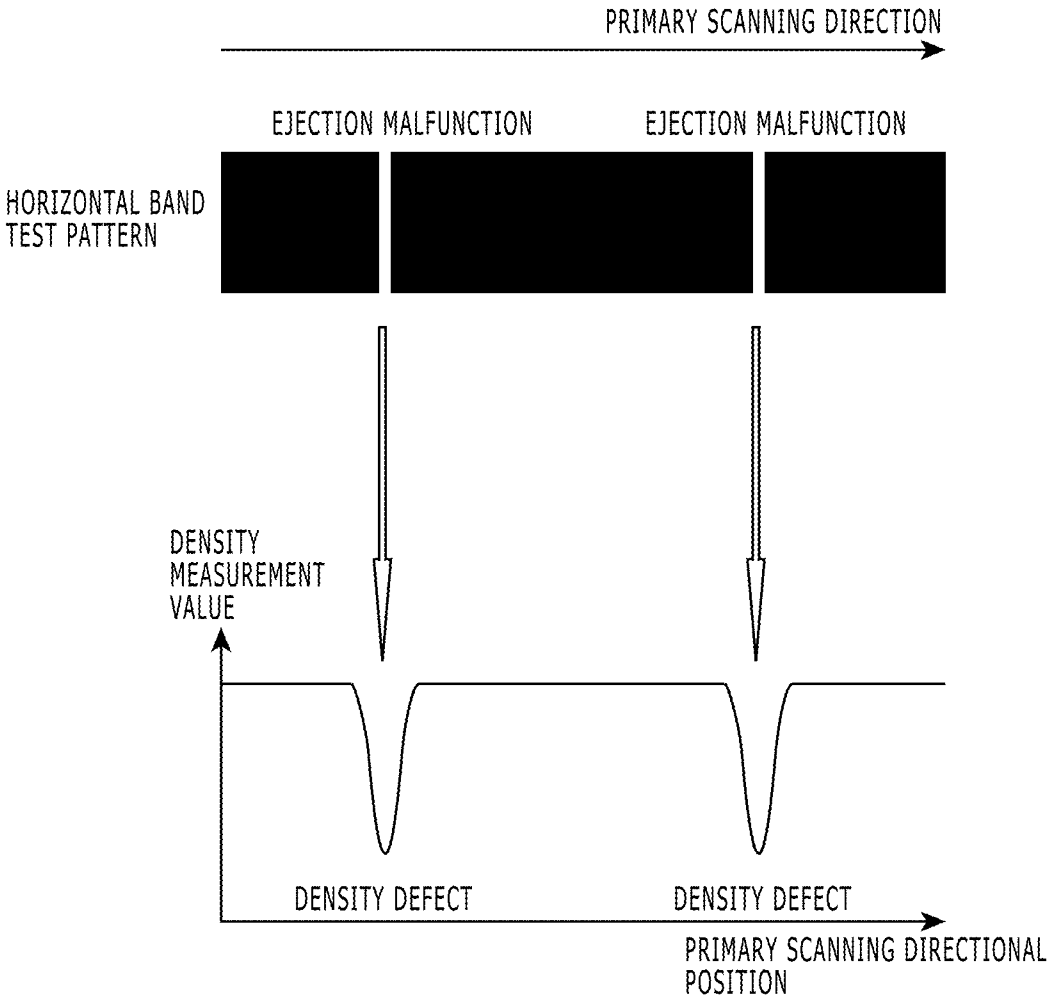
FIG. 5 shows a diagram that explains a density defect in a scanned image of a horizontal band test pattern in the first test pattern.
Figure 6:
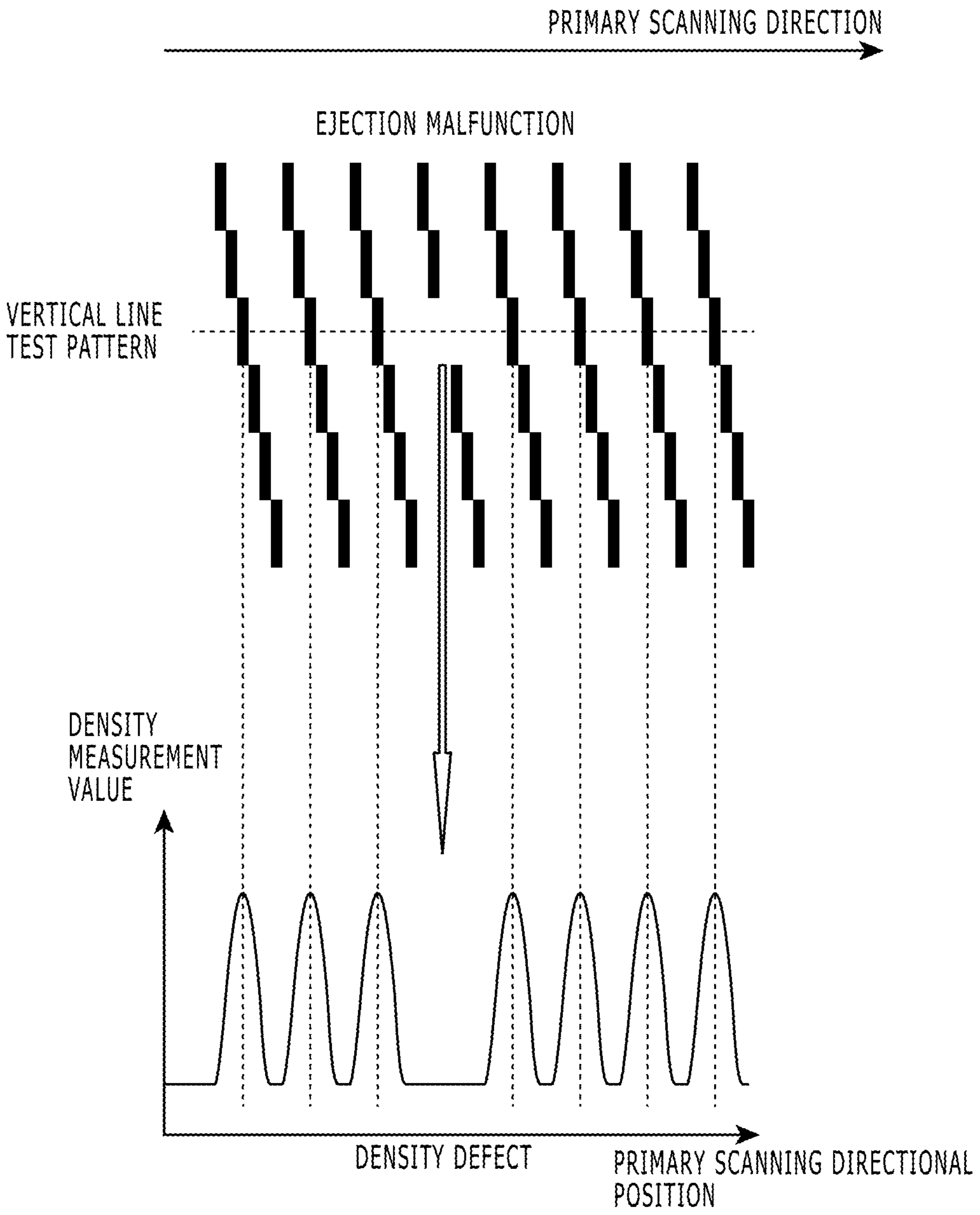
FIG. 6 shows a diagram that explains a density defect in a scanned image of a vertical line test pattern in the first test pattern.

FIG. 4 shows a diagram that indicates an example of a first test pattern. FIG. 5 shows a diagram that explains a density defect in a scanned image of a horizontal band test pattern in the first test pattern. FIG. 6 shows a diagram that explains a density defect in a scanned image of a vertical line test pattern in the first test pattern.

The horizontal band test pattern is a band-shaped image having a single density. The vertical line test pattern is an image including a 1-dot-width vertical line for each nozzle. It should be noted that an arrangement order of vertical lines in the vertical line test pattern is not limited to that shown in FIG. 4.

As shown in FIG. 5, for example, in a scanned image of the horizontal band test pattern, if a dip appears in a primary-scanning-directional density distribution of the scanned image, it is determined that a density defect (i.e. ejection malfunction) occurs. Further, as shown in FIG. 6, for example, in a scanned image of the vertical line test pattern, if a peak is missing in a primary-scanning-directional density distribution of the scanned image, it is determined that a density defect (i.e. ejection malfunction) occurs.

It should be noted that even if a density defect (i.e. ejection malfunction) is detected on the basis of the density distribution of the scanned image of the first test pattern and a density defect position of the density defect is determined, an ejection malfunction nozzle can not be uniquely determined correspondingly to the density defect position in the scanned image.

The ejection malfunction nozzle determining unit 84 causes the recording head to (a) print a second test pattern using the recording head 1*a*, 1*b*, 1*c* or 1*d* if a density defect is detected by the ejection malfunction detecting unit 83, and (b) not perform printing of the second test pattern if no density defects are detected by the ejection malfunction detecting unit 83.

The second test pattern is printed individually for each ink color, and the second test pattern may be printed only for an ink color that a density defect is detected in the first test pattern and the second test patterns may not be printed for the other ink colors.

Figure 7:
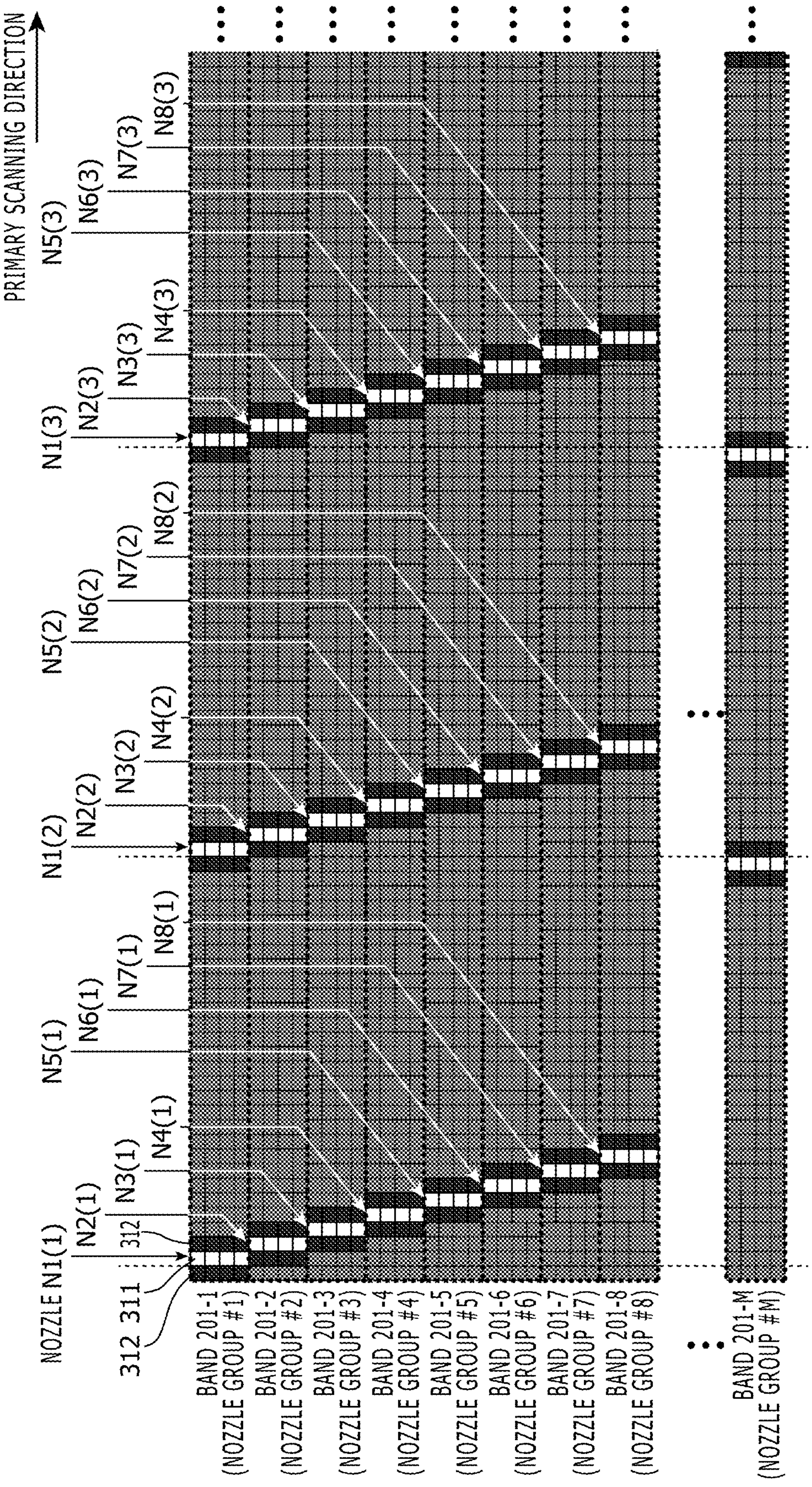
FIG. 7 shows a diagram that indicates an example of a second test pattern.
Figure 8:
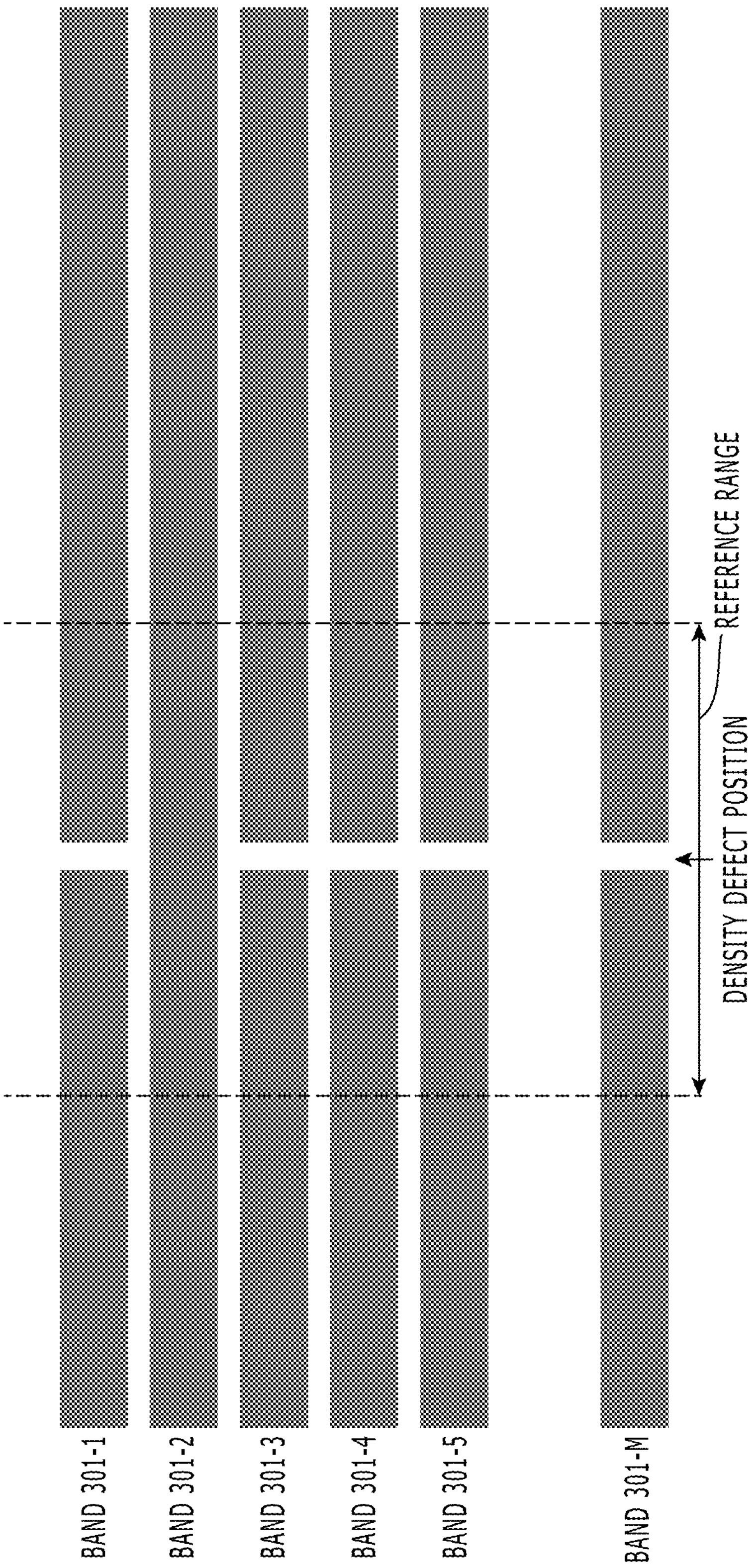
FIG. 8 shows a diagram that explains determination of an ejection malfunction nozzle based on a scanned image of the second test pattern.

FIG. 7 shows a diagram that indicates an example of a second test pattern. FIG. 8 shows a diagram that explains determination of an ejection malfunction nozzle based on a scanned image of the second test pattern.

Plural nozzle groups are set such that each of the plural nozzle groups includes nozzles with a predetermined interval among the nozzles of the recording head 1*a*, 1*b*, 1*c* or 1*d* and the plural nozzle groups are shifted sequentially by one nozzle. The second test pattern includes band images corresponding to the plural nozzle groups such that a correction process has been performed for nozzles included in the nozzle groups.

Here, in the correction process, a nozzle included in the nozzle groups is set as a non-ejection nozzle, and an ink droplet amount is increased for a nozzle corresponding to an adjacent dot of a dot position of the nozzle (set as non-ejection nozzle). Here, pixel values in the second test pattern are set such that the correction process is performed as mentioned.

In a case of the second test pattern shown in FIG. 7, the nozzles are classified into seven nozzle groups #1, . . . , #7 such that nozzles Ni(j) in a nozzle group #i have an interval of M nozzles (i=1, . . . , M; j=1, 2, 3, . . . ). It should be noted that the second test pattern is not limited to that shown in FIG. 7.

The second test pattern includes bands 201-1 to 201-M corresponding to the nozzle groups #1 to #M. In the band 201-*i*, a nozzle Ni(j) in the nozzle group #i corresponds to a blank thin line 311 formed by non ejection. The blank thin line 311 is an image without a density, having a primary-scanning-directional width of 1 dot and a secondary-scanning-directional length of L (here, 4 dots).

For the band 201-*i*, a band 201A is depicted such that the nozzle Ni(j) does not eject ink and nozzles other than the nozzle Ni(j) eject ink with a predetermined ink amount (corresponding to an intermediate gradation density level). When the band 201A is depicted, an amount of ink ejected as a dot 312 adjacent to the blank thin line 311 in the primary scanning direction is increased in the correction process in order to make the blank thin line 311 invisible after printing.

The second test pattern as mentioned is printed. Subsequently, the second test pattern on a print sheet is optically scanned, and a scanned image of the second test pattern is acquired.

As shown in FIG. 8 for example, regarding bands 301-1 to 301-M in the scanned image of the second test pattern that correspond to the band 201-1 to 201-M, referring to density distributions (brightness distributions) of the bands 301-1 to 301-M in a predetermined range around the aforementioned density defect position in the primary scanning direction, detected is a band 301-*k* that no density defects in this range are not detected (in FIG. 7, the band 301-2). A nozzle in the predetermined range among the nozzles Nk(j) in a nozzle group corresponding to the determined band 301-*k* is determined as an ejection malfunction nozzle. It should be noted that a width of the predetermined range is set so as to be equal to or less than a period of the blank thin lines 311.

Specifically, if a nozzle of the blank thin line 311 is an ejection malfunction nozzle, then a blank line due to ejection malfunction is also eliminated by the correction process and therefore the aforementioned density defect is not detected. Contrarily, if a nozzle of the blank thin line 311 is not an ejection malfunction nozzle, then the blank thin line 311 is formed at another position than a position of a blank line due to ejection malfunction and therefore such blank line due to ejection malfunction is not eliminated by the correction process for this band and remains, and therefore the aforementioned density defect is detected in the scanned image.

Returning to FIG. 1, the correction processing unit 85 performs as a hardware process the correction process corresponding to each of the detected ink ejection malfunction nozzle(s) for the image to be printed. In this embodiment, for example, image data (pixel value) of a pixel for which ink should be ejected by an ejection malfunction nozzle is corrected to a value of non ink ejection, and image data (pixel value) of a pixel adjacent to the pixel for which ink should be ejected by an ejection malfunction nozzle is corrected such that a density of this pixel is increased.

Further, in this embodiment, if the aforementioned print job is suspended at a predetermined timing, the ejection malfunction detecting unit 83 causes the recording head to print the first test pattern using each of the recording heads 1*a* to 1*d*, and after printing of the first test pattern, immediately resumes the print job and determines whether there is a density defect in the scanned image in parallel to the print job.

Furthermore, in this embodiment, if the density defect is detected after resuming the print job and the print job is suspended again, the ejection malfunction nozzle determining unit 84 causes the recording head to print the second test pattern on a print sheet using the recording head 1*a*, 1*b*, 1*c* or 1*d* and determines an ejection malfunction nozzle corresponding to the density defect on the basis of a scanned image of the second test pattern. If the density defect is not detected after resuming the print job, the print job is not suspended due to printing of the second test pattern.

In this embodiment, suspension of the print job and printing of each of the first test pattern and the second test pattern are performed between printing on a certain print sheet and printing on a next print sheet in the print job. If the print job is a print job of plural copies, suspension of the print job and printing of each of the first test pattern and the second test pattern are performed between printing of a certain copy and printing of a next copy in printing of the plural copies.

Furthermore, a print sheet on which the first test pattern has been printed and a print sheet on which the second test pattern has been printed may be outputted to another output destination than a destination for a print sheet on which an image specified by the print job is printed.

Figure 9:
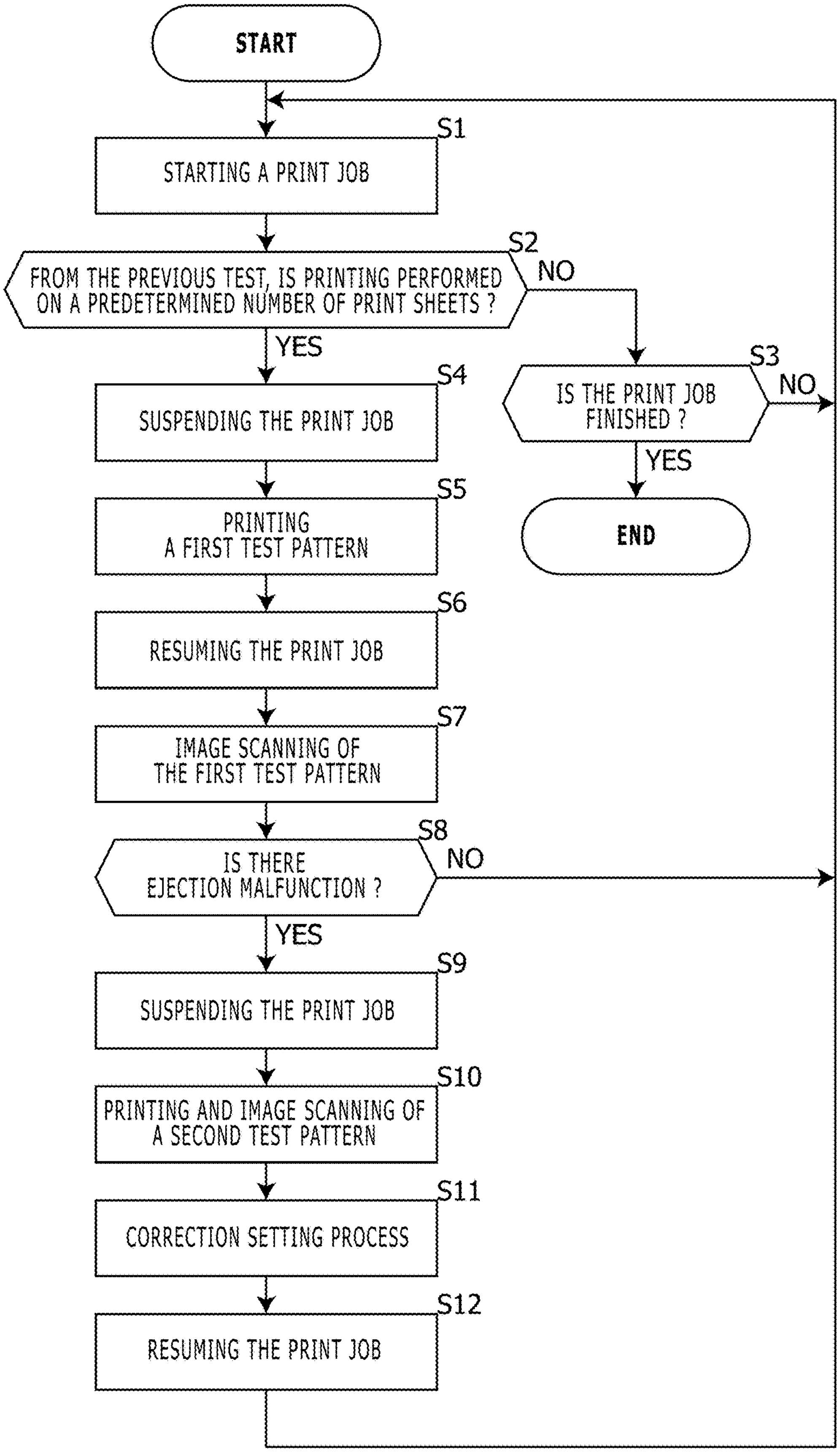
FIG. 9 shows a flowchart that explains a behavior of the image forming apparatus in Embodiment 1.

The following part explains a behavior of the image forming apparatus in Embodiment 1. FIG. 9 shows a flowchart that explains a behavior of the image forming apparatus in Embodiment 1.

When receiving a print request, the control unit 81 causes the image processing unit 82 to perform an image process for an image specified by the print request, and thereby acquires image data of the image to be printed; and causes the image outputting unit 71 to transport a print sheet and print the image to be printed on the print sheet on the basis of the image data (in Step S1).

Until the end of the print job, the control unit 81 counts the number of printed print sheets from a previous test (printing of the aforementioned test pattern and the like) using a counter, and resets the counter at the end of the test, and determines whether a value of the counter of the printed print sheets reaches a predetermined number of sheets (a threshold value) or not (in Steps S2 and S3).

When a value of the counter of the printed print sheets reaches the predetermined number of sheets (the threshold value), the control unit 81 suspends the print job (in Step S4). Upon suspending the print job, the ejection malfunction detecting unit 83 causes the recording head to perform printing of the first test pattern (in Step S5). After printing the first test pattern, the control unit 81 immediately resumes the print job.

Meanwhile, the ejection malfunction detecting unit 83 performs image scanning of the printed first test pattern (in Step S7) and determination of existence of ejection malfunction (in Step S8) in parallel to the resumed print job.

If the ejection malfunction is detected, the control unit 81 suspends the print job again (in Step S9). Upon suspending the print job, the ejection malfunction nozzle determining unit 84 causes the recording head to perform printing and performs image scanning of the second test pattern (in Step S10), and individually determines each ejection malfunction nozzle as mentioned and set the determined ejection malfunction nozzle as a target of the correction process (in Step S11). Afterward, the control unit 81 resumes the print job (in Step S12). After the resuming, in printing based on the print job, when ink ejection should be performed at the determined ejection malfunction nozzle, the correction process (changing the ejection malfunction nozzle to non-ejection nozzle and increasing an ink amount for its adjacent dot) is performed.

Contrarily, if the ejection malfunction is not detected, returning to Step S1, the print job resumed in Step S6 is continuously performed.

As mentioned, in Embodiment 1, the control unit 81 determines nozzles corresponding to an image specified by a user and causes the recording head 1*a*, 1*b*, 1*c* or 1*d* to eject ink from the nozzles. The ejection malfunction detecting unit 83 causes the recording head to (a) print a first test pattern on a print sheet using the recording head 1*a*, 1*b*, 1*c* or 1*d*, and (b) detects a density defect due to ejection malfunction in a scanned image of the first test pattern. The ejection malfunction nozzle determining unit 84 causes the recording head to (a) print a second test pattern using the recording head 1*a*, 1*b*, 1*c* or 1*d* if the density defect is detected by the ejection malfunction detecting unit 83, and (b) not perform printing of the second test pattern if no density defects are detected by the ejection malfunction detecting unit 83.

Consequently, only if ejection malfunction is detected with the first test pattern, an ejection malfunction nozzle is determined with the second test pattern, and therefore, if there are no ejection malfunction, printing the second test pattern is not required for determining an ejection malfunction nozzle and suspending time of a print job is short.

Embodiment 2

In Embodiment 2, other than printing based on the print job, the control unit 81 performs sample printing, that is, printing of a part of the image specified by the print job (only one copy among plural copies, the first page or the like). In Embodiment 2, printing of at least one of the first test pattern and the second test pattern is performed with the sample printing. Printing of the first test pattern and the second test pattern is also performed together because the print job is not performed while the sample printing is performed and consequently suspension of the print job is decreased.

Further, in this embodiment, a print sheet on which an image has been printed in the sample printing, a print sheet on which the first test pattern has been printed, and a print sheet on which the second test pattern has been printed may be outputted to another output destination than a destination for a print sheet on which an image specified by the print job is printed.

Other parts of the configuration and behaviors of the image forming apparatus in Embodiment 2 are identical or similar to those in Embodiment 1, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the first test pattern may include only the aforementioned horizontal band test pattern.

What is claimed is:

1. An image forming apparatus, comprising:

a recording head configured to eject ink corresponding to an image to be printed, using arranged nozzles;

a control unit configured to determine nozzles corresponding to the image and cause the recording head to eject ink from the nozzles;

an ejection malfunction detecting unit configured to cause the recording head to (a) print a first test pattern on a print sheet using the recording head, and (b) detect a density defect due to ejection malfunction in a scanned image of the first test pattern;

an ejection malfunction nozzle determining unit configured to cause the recording head (a) to print a second test pattern using the recording head if the density defect is detected by the ejection malfunction detecting unit, and (b) to not to perform printing of the second test pattern if no density defects are detected by the ejection malfunction detecting unit and wherein, in response to suspending a print job, the ejection malfunction detecting unit causes the recording head (a) to print the first test pattern, (b) to resume the suspended print job after printing the first test pattern, and determines whether a density defect exists in a scanned image of the first test pattern while the print job is being resumed.

2. The image forming apparatus according to claim 1, wherein if the density defect is detected after resuming the print job and the print job is suspended again, the ejection malfunction nozzle determining unit causes the recording head to print the second test pattern on a print sheet and determines an ejection malfunction nozzle corresponding to the density defect on the basis of a scanned image of the second test pattern; and if the density defect is not detected after resuming the print job, the print job is not suspended due to printing of the second test pattern.

3. The image forming apparatus according to claim 1, further comprising a sheet transportation unit that transports a printed sheet to an output destination and wherein a print sheet on which the first test pattern has been printed and a print sheet on which the second test pattern has been printed are transported to another output destination than a destination for a print sheet on which an image specified by the print job is printed.

4. The image forming apparatus according to claim 1, wherein the print job is a print job of plural copies; and each of the first test pattern and the second test pattern is printed between printing of a certain copy and printing of a next copy in printing of the plural copies.

5. The image forming apparatus according to claim 1, wherein the control unit performs sample printing that is printing of a part of the image specified by the print job; and printing of at least one of the first test pattern and the second test pattern is performed with the sample printing.

* * * * *